(12) United States Patent
Sen

(10) Patent No.: US 12,315,233 B1
(45) Date of Patent: May 27, 2025

(54) OPTICAL FUZZER

(71) Applicant: Robi Sen, Richland, WA (US)

(72) Inventor: Robi Sen, Richland, WA (US)

(*) Notice: Subject to any disclaimer, the term of this patent is extended or adjusted under 35 U.S.C. 154(b) by 238 days.

(21) Appl. No.: 18/079,869

(22) Filed: Dec. 12, 2022

Related U.S. Application Data

(60) Provisional application No. 63/288,577, filed on Dec. 11, 2021.

(51) Int. Cl.
| | | |
|---|---|---|
| *G06V 10/776* | (2022.01) | |
| *G05D 1/00* | (2006.01) | |
| *G05D 1/04* | (2006.01) | |
| *G06V 10/141* | (2022.01) | |
| *G06V 10/82* | (2022.01) | |
| *G06V 10/70* | (2022.01) | |

(52) U.S. Cl.
CPC ........... *G06V 10/776* (2022.01); *G05D 1/042* (2013.01); *G06V 10/141* (2022.01); *G06V 10/82* (2022.01); *G06V 10/70* (2022.01)

(58) Field of Classification Search
CPC ...... G06V 10/70; G06V 10/77; G06V 10/771; G06V 10/7715; G06V 10/772; G06V 10/774; G06V 10/776; G06V 10/00; G06V 10/10; G06V 10/141; G06V 10/145; G06V 10/82
See application file for complete search history.

(56) References Cited

U.S. PATENT DOCUMENTS

| | | | |
|---|---|---|---|
| 7,817,085 B2 | 10/2010 | Harris | |
| 8,254,847 B2 | 8/2012 | Sen | |
| 8,779,912 B2 | 7/2014 | Sverrisson et al. | |
| 10,051,475 B2 | 8/2018 | Shattil et al. | |
| 10,122,694 B2 | 11/2018 | Shattil et al. | |
| 10,198,645 B2 | 2/2019 | Graumann et al. | |
| 10,239,637 B2 | 3/2019 | Ashdown et al. | |
| 10,469,186 B2 | 11/2019 | Shattil et al. | |
| 10,852,433 B2 * | 12/2020 | Chen | G01S 7/4861 |
| 10,985,861 B2 | 4/2021 | Nguyen et al. | |
| 11,273,841 B2 | 3/2022 | Goldman | |
| 11,281,921 B2 | 3/2022 | Nikitidis et al. | |
| 11,310,439 B2 | 4/2022 | Djakovic et al. | |
| 11,341,778 B1 | 5/2022 | Joshi et al. | |
| 2008/0103649 A1 | 5/2008 | Shen et al. | |

(Continued)

OTHER PUBLICATIONS

Rini, Controlling a Laser's Phase, Sep. 20, 2016, Physics, https://physics.aps.org/articles/v9/s102 (Year: 2016).*

(Continued)

*Primary Examiner* — Russell Frejd
*Assistant Examiner* — Sara J Lewandroski
(74) *Attorney, Agent, or Firm* — Steven J Shattil

(57) ABSTRACT

A machine-learning system is trained to adapt light transmitted from an array of light emitters in order to disrupt a navigation system that employs a camera. Training comprises receiving image-processing outputs and/or navigation signals from the navigation system; configuring the array of light emitters to occupy a portion of a field of view of the camera; adapting a modulation pattern of light emitted by the array; and determining, from the image-processing outputs and/or navigation signals, if the modulation pattern affects at least one of image processing or navigation control performed in the navigation system.

15 Claims, 2 Drawing Sheets

(56) References Cited

U.S. PATENT DOCUMENTS

| | | |
|---|---|---|
| 2012/0169522 A1 | 7/2012 | Huneycutt |
| 2016/0226892 A1 | 8/2016 | Sen et al. |
| 2017/0132477 A1 | 5/2017 | Kim et al. |
| 2017/0228586 A1 | 8/2017 | Morishita |
| 2018/0034852 A1 | 2/2018 | Goldenberg |
| 2018/0130168 A1 | 5/2018 | Nayshtut et al. |
| 2019/0020439 A1 | 1/2019 | Fawaz et al. |
| 2020/0083979 A1 | 3/2020 | Roberts et al. |
| 2021/0110018 A1 | 4/2021 | Rowe et al. |
| 2021/0110185 A1 | 4/2021 | Rowe et al. |
| 2021/0303890 A1 | 9/2021 | Wei |
| 2021/0343165 A1 | 11/2021 | Baumgart et al. |
| 2023/0076107 A1 | 3/2023 | Rudow et al. |
| 2023/0139748 A1 | 5/2023 | Fox et al. |

OTHER PUBLICATIONS

Wallace, Photonics Products: High-power Laser-Diode Arrays: Diode arrays are compact, high-power light dynamos, Jan. 16, 2015, Lasers and Sources, https://www.laserfocusworld.com/lasers-sources/article/16551520/photonics-products-high-power-laser-diode-arrays-diode-arrays-are-compact-high-power-light (Year: 2015).*

Davidson et al., Controlling UAVs with Sensor Input Spoofing Attacks, 2016, 10th USENIX Workshop on Offensive Technologies (WOOT 16) (Year: 2016).*

Cao et al., Adversarial Sensor Attack on LiDAR-based Perception in Autonomous Driving, 2019, CCS (Year: 2019).*

Yan et al., Can You Trust Autonomous Vehicles: Contactless Attacks against Sensors of Self-Driving Vehicle, 2016, Def Con 24 (Year: 2016).*

Y. Zhang, et al.; "Perception and sensing for autonomous vehicles under adverse weather conditions: A survey"; ISPRS Journal of Photogrammetry and Remote Sensing, Jan. 9, 2023.

Z. Goldberg, et al.; "Jamming and Spoofing Attacks: Physical Layer Cybersecurity Threats to Autonomous Vehicle Systems"; Before the National Highway Traffic Safety Administration Washington, DC; Nov. 21, 2016.

P. Szoldra; "Hackers show how they tricked a Tesla into hitting objects in its path"; Insider, https://www.businessinsider.com/defcon-tesla-jamming-spoofing-autopilot-2016-8 Aug. 8, 2016.

J. Torchinsky, "Hackers Show that Tesla Autonomous Sensors Can Be Fooled, But It's All a Bit Stupid"; Jalopnik.com, https://www.forbes.com/sites/thomasbrewster/2016/08/04/tesla-autopilot-hack-crash/?sh=4ca803f62b87; Aug. 4, 2016.

C. Yan, et al.; "Can You Trust Autonomous Vehicles: Contactless Attacks against Sensors of Self-Driving Vehicles"; Def Con 24 (2016).

K. Okokpujie, et al.; "Anomaly-Based Intrusion Detection for a Vehicle Can Bus: A Case for Hyundai Avante CN7"; Journal of Southwest Jiaotong University, vol. 56 No. 5, Oct. 2021.

M. Lichtman, et al.; "A Communications Jamming Taxonomy"; EEE Computer and Reliability Societies, Jan./Feb. 2016.

M. Pham, et al.; "A Survey on Security Attacks and Defense Techniques for Connected and Autonomous Vehicles"; https://arxiv.org/pdf/2007.08041.pdf, Jul. 16, 2020.

H. Shin, et al.; "Illusion and Dazzle: Adversarial Optical Channel Exploits against Lidars for Automotive Applications"; International Conference on Cryptographic Hardware and Embedded Systems, pp. 445 467, Springer, 2017.

J. Petit, et al.; "Remote Attacks on Automated Vehicles Sensors: Experiments on Camera and LiDAR"; In Black Hat Europe, 2015.

J. Sun, et al.; "Towards Robust LiDAR-based Perception in Autonomous Driving: General Black-box Adversarial Sensor Attack and Countermeasures"; In USENIX Security, 2020.

Y. Cao, et al.; "Adversarial Sensor Attack on LiDAR-based Perception in Autonomous Driving"; https://arxiv.org/pdf/1907.06826.pdf, Aug. 20, 2019.

I. Sobh, et al.; "Adversarial Attacks on Multi-task Visual Perception for Autonomous Driving"; Journal of Imaging Science and Technology, Nov.-Dec. 2021.

S. Thys, et al.; "Fooling automated surveillance cameras: adversarial patches to attack person detection"; Proc. CVPR Workshops (IEEE, Piscataway, NJ, 2019).

B. Tarchoun, et al.; "Adversarial Attacks in a Multi-view Setting: An Empirical Study of the Adversarial Patches Inter-view Transferability"; arXiv:2110.04887v1 [cs.CR] Oct. 10, 2021.

* cited by examiner

OPTICAL FUZZER

CROSS REFERENCE TO PRIOR APPLICATIONS

This application claims the priority benefit of U.S. Provisional Pat. Appl. No. 63/288,577, filed on Dec. 11, 2021; which is expressly incorporated by reference herein in its entirety.

INTRODUCTION

I. Field

Aspects of this disclosure relate generally to remote-sensing and imaging systems, and more particularly, to the use of such systems for object detection and vehicle navigation.

II. Background

The background description includes information that may be useful in understanding the present inventive subject matter. It is not an admission that any of the information provided herein is prior art or relevant to the presently claimed inventive subject matter, or that any publication, specifically or implicitly referenced, is prior art.

Autonomous vehicles use a wide variety of sensors for a wide range of applications, from navigation to spatial awareness. Optical sensors are often used in autonomous vehicles for object detection and spatial awareness, especially with autonomous drones and cars. One important technology for sensing is Optical Flow. Optical flow can be summarized as the apparent motion between one or more sensors and a viewable scene. It is now widely used in autonomous vehicles for velocity calculation and position.

Recently, researchers have shown that optical sensors can often be affected as to confuse, and in autonomous vehicles, potentially cause a collision by displaying various images that confuse the platform using these sensors. In such cases, the researchers have prior knowledge of what will affect the targeted device. They can configure sensors based on a priori knowledge of how those sensors work to create effective patterns that produce the outcomes they desire. However, crafting specific exploits per targeted system by hand is labor-intensive. Secondly, by their nature, they are one-off solutions requiring additional labor to generate new attacks. Thirdly, they employ exploits that typically only work at night. Lastly, these approaches allow no ability to react to the target's behavior and/or to changes in the environment.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide certain technical advantages.

One aspect comprises methods and apparatus configured for training a machine-learning system to adapt light transmissions in order to disrupt a navigation system that employs a camera. A method comprises receiving image-processing outputs and/or navigation signals from the navigation system; configuring an array of light emitters to occupy a portion of a field of view of the camera; adapting a modulation pattern of light emitted by the array; and determining, from the image-processing outputs and/or navigation signals, if the modulation pattern affects at least one of image processing or navigation control performed in the navigation system.

In one example, the machine-learning system might comprise a deep-learning neural network or some other type of Artificial Intelligence. During training, the machine-learning system can be configured to receive feedback (e.g., including the image-processing outputs and/or navigation signals) from the navigation system, such as from the navigation system's camera, image processing circuitry, and/or navigation controller. A feedback interface might be configured for communicatively coupling feedback signals from the navigation system to the machine-learning system. The machine-learning system might determine from the feedback how to adapt the pattern of light emitted by the array to achieve a target image-processing output and/or navigation signal. For example, the machine-learning system might adapt control parameters of a controller of the array.

In some aspects, the navigation system might employ a camera neural network to perform image processing on images captured by the camera. Image-processing outputs from the camera neural network might comprise object detection, object recognition, object location, object movement, predictions, and the like. The machine-learning system select a target image-processing output as a ground truth for use in training. For example, the machine-learning system might compute an error function as a difference between the image-processing outputs and the ground truth. The machine-learning system might compute correlations between one or more of the control parameters of the array (e.g., light-pattern parameters) and the change in the error function, followed by computing how much to update the control parameters. The machine-learning system might perform gradient descent to update a light modulation pattern, for example.

In one example, methods and apparatus can be configured to manipulate a vehicle that employs one or more optical sensors for autonomous navigation. One method comprises receiving measurements from at least one sensor that is responsive to the vehicle's movement; adapting a modulation pattern used to modulate an array of light emitters; and determining, from the measurements, if the modulation pattern affects the vehicle's movement. The method may employ the machine-learning system that is trained according to the methods disclosed herein. An optical system configured to perform the method might comprise the array of light emitters and controller. A feedback interface might include a remote-sensing system, such as a camera, an optical sensor, a LIDAR, a RADAR, or an acoustic sensor configured to detect, locate, and track the vehicle. The feedback interface communicates feedback signals to the machine-learning system, which might comprise measurements of at least one of yaw, pitch, roll, heading, speed, velocity, altitude, acceleration, deceleration, vibration, ascent, descent, or derivatives thereof with respect to time.

In some instances, the light emitters comprise at least one of light-emitting diodes and lasers. The array might be a linear array, a planar array, or a volumetric array. The modulation pattern employed by the array can comprise at least one of amplitude modulation, on-off keying, frequency modulation, phase modulation, index modulation, or spatial modulation. In some instances, the machine-learning system might produce labeled data sets comprising modulation patterns as input data and measurements of the vehicle's movement as associated ground truths.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Some disclosed aspects can provide a generic solution to deal with the issues mentioned above. In some aspects, an optical fuzzer can be controlled by a Machine Learning algorithm or Deep Learning model. The system can work, at least in part, by employing the concept of fuzzing from information security. In information security, fuzzers are automated systems intended to provide unexpected or random inputs to a targeted system—for example, a drone's onboard cameras. The inputting of unexpected data is performed to probe for various responses in a system, such as crashes, odd behavior, consistent desirable behavior, and the like. There may also be a feedback system that monitors the target's reactions to inputs and provides feedback about the system's response to a user interface or another system. The optical fuzzer can be configured to blindly create optical exploits without the need for humans to craft specific attacks on a targeted system. Disclosed aspects can provide an automated fuzzer for the detection and development of optical exploits against optical sensors.

In some disclosed aspects, the optical fuzzer departs from traditional methods of exploiting light sensors, such as blinding the target or projecting images on surfaces (like a wall) to confuse the optical sensor. These methods are generally slow, involving substantial user interaction to study the targeted system and then develop a method to exploit that system. In general, that exploit is only useable against that particular type of system.

Figure 1A:
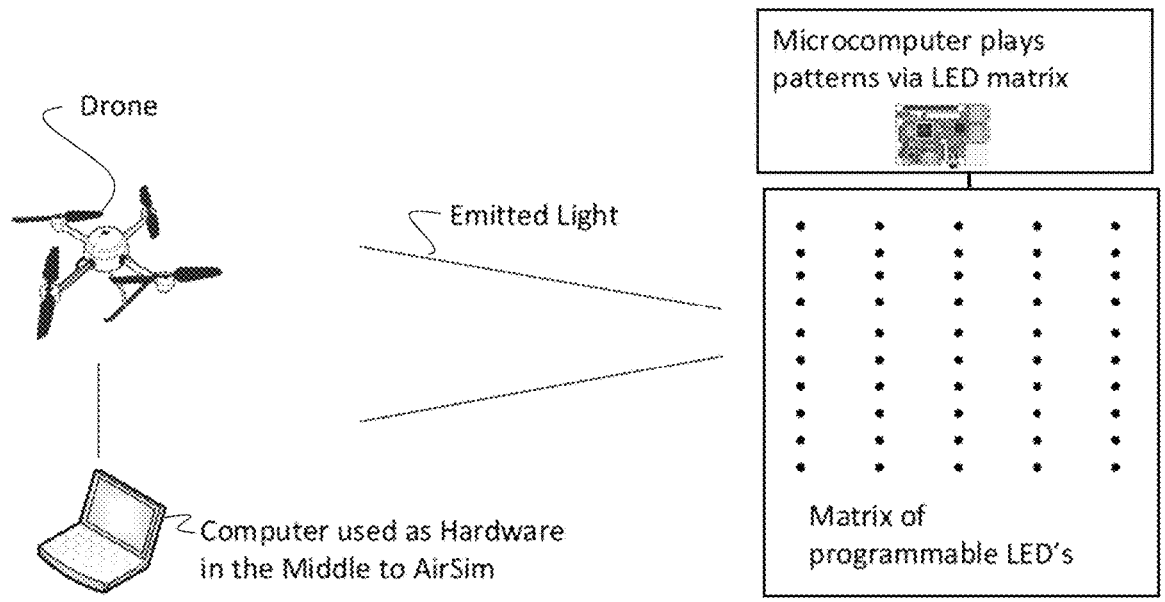
FIG. 1A depicts how method and apparatus aspects of an optical fuzzer might be used according to non-limiting aspects of the disclosure.

As depicted in FIG. 1A, the optical fuzzer can use one or more programmable arrays of light emitters (e.g., LEDs) within or outside of the visible range, and controllable by a computer (e.g., microcomputer). A computational system can execute various commands to enable granular programmatic controls of each individual emitter in the array, allowing the system to emit patterns that can change color, intensity, frequency of on/off state, and the like. This allows the system to try different patterns via adapting various operating parameters to attempt to create a fault in the target. In one aspect, a neural network responsive to feedback attempts to generate patterns and sequences that cause desired effects. Systems, if configured in specific ways, could also detect specific or similar attacks to allow for near-real-time exploitation. Such actions can be driven by the neural network. The disclosed system might include an Application Programming Interface (API), such as to enable users to program or control the systems, machine to machine interfaces, and/or for other applications, such as data sharing.

The disclosed system can be automated in various configurations, enable more complete testing coverage, and/or provide a faster time to exploit. ML can be employed to facilitate development of attacks while fuzzing. The system can work in daylight as well as at night. Some aspects can employ different emitters in different bands of the spectrum. Some aspects can target Infrared sensors.

Figure 1B:
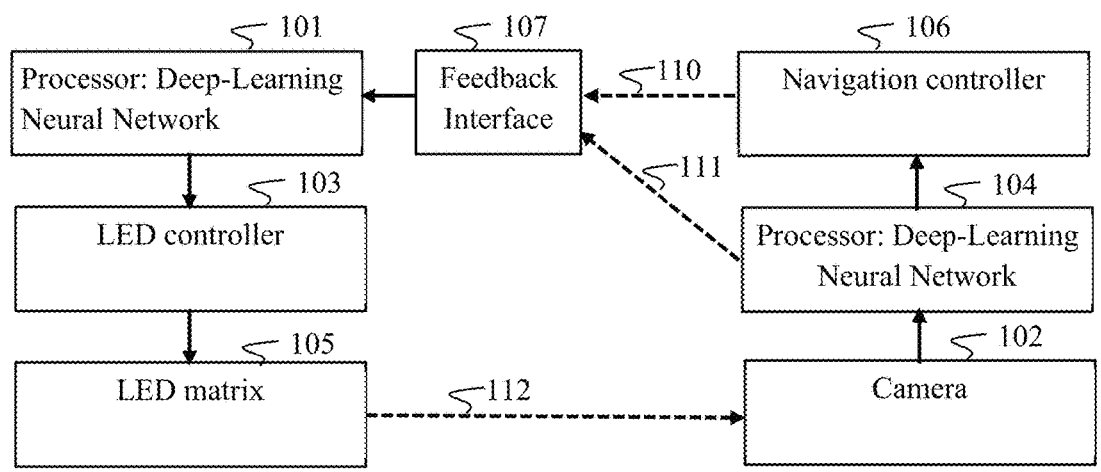
FIG. 1B illustrates apparatus and method aspects configured for training a machine learning (ML) system. In at least a supervised learning (e.g., training) mode, a deep learning neural network 101, a light-emitting diode (LED) controller 103, and an LED array 105 might employ a feedback interface 107 to communicatively couple to at least a camera 102 and camera processor 104. In an unsupervised learning mode, the deep learning neural network 101, the LED controller 103, and the LED array 105 might employ feedback interface 107 to communicatively couple directly or indirectly to the navigation controller. In such aspects, the feedback interface 107 might comprise a remote-sensing system, such as a camera, radar, lidar, or the like. In an online, or operational mode, the deep learning neural network 101, the LED controller 103, and the LED array 105 might optionally employ the feedback interface 107 remotely sensing a system (such as a vehicle) that employs the camera system 102 and 104.

FIG. 1B illustrates apparatus and method aspects configured for training an ML system 101, which can comprise Artificial Intelligence, such as a Deep Learning Neural Network. The ML system 101 comprises at least one computer processor, non-transitory computer-readable memory, and software instructions stored in the memory configured to make the at least one computer processor perform the disclosed features. The ML system 101 is communicatively coupled to at least one LED controller 103, which is configured to control patterns transmitted by at least one LED matrix 105.

The ML system 101 is communicatively coupled to a feedback interface 107, which employs an information coupling 110 and/or 111 from at least one camera processor 104 and/or a navigation controller 106. In the disclosed aspects, light patterns emitted by the at least one LED matrix 105 provide information coupling 112 (e.g., signal inputs) to a camera system comprising at least one camera 102.

The at least one camera processor 104 comprises an ML system, which can comprise Artificial Intelligence, such as a Deep Learning Neural Network, configured to classify features detected by the at least one camera 102. These classifications may be communicated to the optional navigation controller 106, which is responsive to the classifications for navigating an autonomous vehicle.

In one instance, the ML system 101 is communicatively coupled (e.g., information coupling 111) to the at least one camera processor 104. The ML system 101 might be responsive to the classifications produced by the at least one camera processor 104 for configuring neural network parameters (e.g., weights) that cause signals 112 to be produced (via LED controller 103 and the LED matrix 105) to produce a desired classification set. In one example, the classifications produced by the at least one camera processor 104 are employed by the ML system 101 as neural network outputs, and the desired classification set is used as ground truth. The ML system 101 adapts its neural network weights to configure the LED signals 112 to cause the at least one camera processor 104 to behave in a desired manner, such as producing the desired classification set.

In another instance, ML system 101 might be responsive to the navigation signals produced by the navigation controller 106. In one example, the information coupling 110 is a direct communication coupling between the navigation controller 106 and the feedback interface 107. In another example, the information coupling 110 is an indirect communication coupling between the navigation controller 106 and the feedback interface 107. For example, the feedback interface might comprise a remote-sensing system (e.g., camera, radar, etc.) that detects a vehicle controlled by the navigation controller 106, and determines from the movement of the vehicle which navigation signals were produced by the navigation controller 106 and/or which classifications were produced by the at least one camera processor 104. The ML system 101 might employ the actual or inferred navigation signals as neural network outputs and a desired navigation signal set (or vehicle movement) as a ground truth. The ML system 101 adapts its neural network weights to configure the LED signals 112 to cause the navigation controller 106 (and/or the vehicle) to behave in a desired manner.

In another instance, information coupling 111 might be implemented indirectly by communicatively coupling the camera 102 to the ML system 101 via the feedback interface 107. For example, functions of the camera 102 that are provisioned by the at least one camera processor 104 might be employed to infer the behavior of the at least one camera processor 104.

Combining region proposals with a CNN (known as an R-CNN) attempts to locate objects in an image (object detection). Region proposals are selected parts of the original image that are likely contain the objects being searching for. RPN comprises a classifier and a regressor. The classifier determines the probability of a proposal having the target object, and regression regresses the coordinates of the proposals.

Unlike illuminating the environment using intensity-modulated LEDs, disclosed aspects configure an LED matrix to illuminate only a small portion of the camera's field of view (i.e., a portion of the image that the camera processes). The entire scene does not need to be illuminated. This is because despite the spatial filtering processes (e.g., filter size, stride length, pooling) that occur in a CNN, the abstract feature space in which the CNN operates can be influenced by a tiny portion of the scene. For example, it has been determined experimentally that when the LED matrix occupies a tiny fraction of the field of view, it can disrupt object detection and other processes in the image corresponding to other portions of the field of view.

Figure 2A:
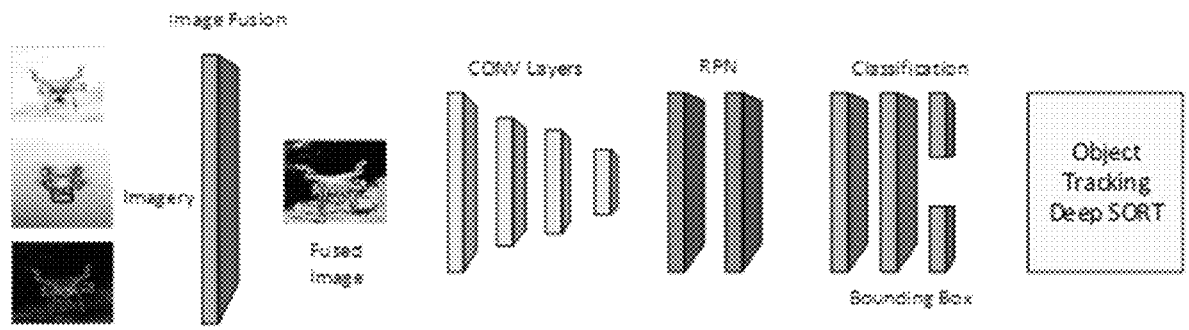
FIG. 2A illustrates apparatus and method aspects that can employ a detection algorithm that might be used for automatic target detection.
Figure 2B:
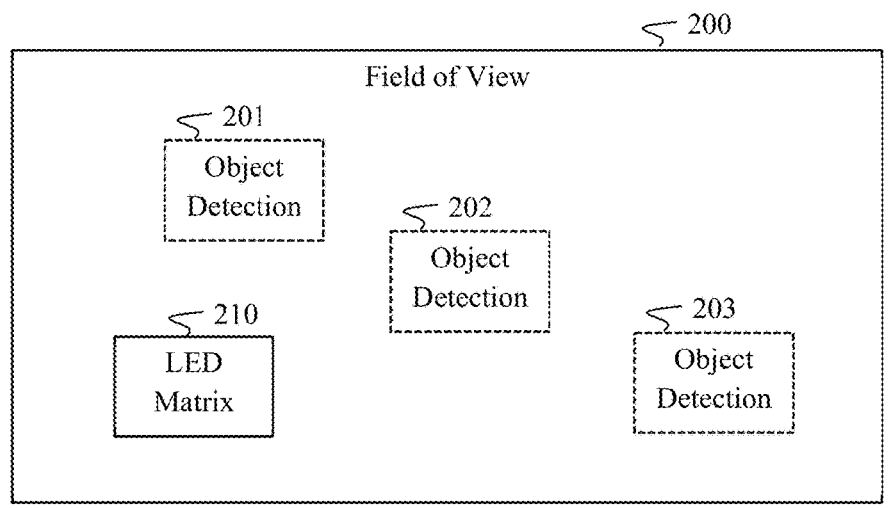
FIG. 2B illustrates how the LED array might comprise a small portion of a scene within a camera's field of view.

FIG. 2B illustrates a scene within a camera's 102 field of view 200. The camera 102 normally captures an image of its field of view 200 and attempts to detect objects 201-203 in the image. For example, each detected object might be indicated in a user interface by a bounding box 201-203 used to describe the spatial location of the corresponding object. Another commonly used bounding box representation is the (x,y)-axis coordinates of the bounding box center, and the width and height of the box. Object detection might be followed by object identification, which might be followed by developing navigation criteria and/or control mechanisms based on the identified objects.

The LED matrix 210 can be configured to illuminate only a portion of the field of view 200, and thus, the image. The light pattern emitted by LED matrix 210 is configured by the controller 103 to adapt conditions in the camera processor's 104 abstract feature space (i.e., neural network subspace) in order to cause the processor 104 to operate differently than how it was trained to operate. This can cause the navigation controller's 106 operation to be controlled by the ML system 101. Through experimentation, it was discovered that AI is susceptible to saturation in the abstract feature space in the deep layers of a neural network in a similar manner that a camera might suffer from overexposure. In one example, the LED controller 103 modulates each smart LED in the LED array 105 to generate high-frequency flickering patterns that prevent the camera processor 104 from detecting the objects 201-203 in the scene. During training, the ML system 101 learns to disrupt the camera processor's 104 by adapting the LED waveform (which can be characterized by modulation frequency, intensity, and duty cycle) and analyzing the resulting behavior of the processor 104 and/or navigation controller 106. In addition, the LED controller 103 can turn different numbers of LEDs on to generate different intensities and control the RGB channels of the LEDs to vary the color. Smart bulb LEDs can have built-in independent RGB/white channels for controlling color/intensity. Each channel can be controlled by a separate pattern.

FIG. 2A illustrates apparatus and method aspects that can employ a detection algorithm. Automatic Target Detection is an important area of research for defense, with neural networks becoming much more popular. In some aspects, spatial and spectral data can be fused to enhance detection. In some aspects, detection and tracking targets of interest can use a neural network architecture that employs trained models to fuse imagery in order to generate highly discriminative features maps, and then feeds this feature information to a traditional, but faster, R-CNN network for classification and identification. The R-CNN then conveys its outputs to a Deep SORT implementation or some other object-tracking mechanism.

In one aspect, a detection system uses inputs from multiple sensors, such as MWIR, LWIR, and/or visible sensors. This approach might be used with a number of images across different frequency spectrums. Imagery from each sensor could be combined with additional spectral, spatial, and/or temporal data to improve detection.

An image fusion approach that could be similar to pixel-level fusion style might be employed. In one example, multiple images might be combined into a single image. As shown in FIG. 2A, each sensor input is fused into an image with multiple channels containing sensor information, such as LWIR, MWIR, visible, and/or other information derived from the sensors. This creates a fused image of the various spectrum and spatial information. Furthermore, all original data can be preserved and subsequently added to their own channels. After the fused image is obtained, it is then passed to the R-CNN. This approach offers a relatively low computational load while providing a rich set of features for detection.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C . . . sctn. 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method to manipulate a vehicle that employs one or more optical sensors for autonomous navigation, the method comprising:
    receiving measurements from at least one sensor that is responsive to the vehicle's movement;
    employing an artificial neural network (ANN) to adapt a modulation pattern used to modulate an array of light emitters;
    transmitting the modulation pattern from the array of light emitters to the one or more optical sensors; and
    determining, from the measurements, if the modulation pattern affects the vehicle's movement and configuring the ANN to adapt the modulation pattern to cause a predetermined type of movement.

2. The method of claim 1, wherein the at least sensor comprises at least one of a camera, an optical sensor, a LIDAR, a RADAR, or an acoustic sensor.

3. The method of claim 1, wherein receiving measurements comprises measuring the vehicle's movement.

4. The method of claim 3, wherein measuring the vehicle's movement comprises measuring at least one of yaw, pitch, roll, heading, speed, velocity, altitude, acceleration, deceleration, vibration, ascent, descent, or derivatives thereof with respect to time.

5. The method of claim 1, wherein the vehicle is an unmanned aerial vehicle, a ground vehicle, a boat, a submarine, or a missile.

6. The method of claim 1, wherein the light emitters comprise at least one of light-emitting diodes and lasers.

7. The method of claim 1, wherein the array is a linear array, a planar array, or a volumetric array.

8. The method of claim 1, wherein the modulation pattern comprises at least one of amplitude modulation, on-off keying, frequency modulation, phase modulation, index modulation, or spatial modulation.

9. The method of claim 8, wherein the spatial modulation comprises at least one of linear modulation, planar modulation, or volumetric modulation.

10. The method of claim 1, wherein determining, from the measurements, if the modulation pattern affects the vehicle's movement comprises producing labeled data sets comprising modulation patterns as input data and measurements of the vehicle's movement as associated ground truths.

11. The method of claim 1, wherein the ANN is a deep-learning neural network.

12. The method of claim 1, further comprising configuring the array of light emitters to affect only a portion of the one or more optical sensors' field of view.

13. A method of disrupting a navigation system that employs a camera, the method comprising:
    receiving output signals from the navigation system comprising at least one of image-processing outputs and navigation signals;
    configuring an array of light emitters to occupy a portion of a field of view of the camera;
    employing an artificial neural network (ANN) to adapt a modulation pattern of light emitted by the array; and
    determining, from the output signals, if the modulation pattern affects at least one of image processing or navigation control performed in the navigation system and configuring the ANN to adapt the modulation pattern to cause a predetermined type of movement.

14. The apparatus of claim 13, wherein the image-processing outputs comprise outputs of a camera neural network that is responsive to an image captured by the camera; wherein the ANN denotes a target image-processing output as a ground truth; and wherein the ANN computes an error function as a difference between the image-processing outputs and the ground truth.

15. The apparatus of claim 14, wherein the ANN performs gradient descent to update the modulation pattern, the gradient descent comprising a function of the error function.

* * * * *